United States Patent [19]

Luling

[11] Patent Number: 5,585,790
[45] Date of Patent: Dec. 17, 1996

[54] METHOD AND APPARATUS FOR DETERMINING ALIGNMENT OF BOREHOLE TOOLS

[75] Inventor: Martin Luling, Danbury, Conn.

[73] Assignee: Schlumberger Technology Corporation, Ridgefield, Conn.

[21] Appl. No.: 441,845

[22] Filed: May 16, 1995

[51] Int. Cl.$^6$ .............................. G01V 1/00; G01V 1/40
[52] U.S. Cl. .................................. 340/853.8; 340/854.6
[58] Field of Search .......................... 340/853.1, 853.2, 340/853.8, 854.6, 855.4; 73/151, 152; 33/304; 367/25; 181/102, 108; 324/448, 449, 207

[56] References Cited

U.S. PATENT DOCUMENTS

| | | | |
|---|---|---|---|
| 4,710,708 | 12/1987 | Rorden et al. | 324/207 |
| 5,042,611 | 8/1991 | Howlett | 181/104 |
| 5,144,590 | 9/1992 | Chon | 367/57 |
| 5,289,433 | 2/1994 | Cowles et al. | 181/102 |
| 5,307,072 | 4/1994 | Jones, Jr. | 324/448 |

OTHER PUBLICATIONS

B. R. Spies, Survey Design Considerations for Cross–Well Electromagnetics, *1992 Annual SEG Meeting*, New Orleans.

*Primary Examiner*—Ian J. Lobo
*Attorney, Agent, or Firm*—Martin D. Hyden; Keith G. W. Smith

[57] ABSTRACT

A method of determining alignment of first and second parts of a borehole tool system in which three mutually orthogonal signals are transmitted by a transmitter in the first tool part and each signal is received and measured in three mutually orthogonal directions at a receiver in the second tool part, the components of each signal in the three mutually orthogonal directions at the receiver being used to determine the alignment of the first and second parts. The method has applications in deep electromagnetic or acoustic measurements, either from a single well or in a cross-well system.

24 Claims, 3 Drawing Sheets

METHOD AND APPARATUS FOR DETERMINING ALIGNMENT OF BOREHOLE TOOLS

FIELD OF THE INVENTION

The present invention relates to a method and apparatus for determining the alignment of borehole tools and, in particular, to the use of such methods and apparatus in borehole tools for investigation of underground formations.

BACKGROUND OF THE INVENTION

In conventional borehole electromagnetic investigation techniques, a sonde having one or more transmitters and receivers is lowered into a borehole and logged back to the surface while making measurements. Because the transmitters and receivers are located in the same sonde body, their relative position (distance and alignment) is fixed and variations in measurements can be attributed to variations in the formation surrounding the borehole rather than to relative movement between the transmitters and receivers. This condition even applies to logging-while-drilling tools since the relative positions of the transmitter and receiver are fixed there also.

The depth of investigation of an electromagnetic technique for investigating underground formations is typically dependent upon the separation of the transmitter and receiver. In conventional electromagnetic measurements, the depth of investigation is of the order of 0.1 to 10 meters. For very deep measurements or cross-well measurements, which might have a depth of investigation of 10 to more than 100 meters, it is impractical to locate the transmitter and receiver in the same rigid sonde or tool string due to the large transmitter-receiver spacing required or the need to separate the functions between wells. Once the transmitter and receiver are separated, even when in the same well and connected by wireline cable, there is a possibility of relative movement in their alignment which will have an effect on the response of the tool.

This problem is also encountered in other deep measurement techniques such as cross-well seismic measurements which require that the relative position of transmitters and receivers be reasonably well known. In cross-well seismic techniques, both borehole trajectories are accurately mapped with a triaxial accelerometer to determine the vector-valued up-down direction of gravity and a triaxial magnetometer to determine the vector-valued north-south direction of the earth magnetic field. These measurements usually are wireline based. They are integrated along the wellbore trajectory and serve to determine the absolute position of each point with respect to the (x,y,z)-coordinates of a reference point at the surface of each well. The vector-valued distance between the two well-reference points at the surface are measured using standard geodesic surveying techniques. Finally, the three vector-valued distances are combined to determine the vector-valued distance, namely the relative position between transmitters and receivers. In addition to providing the absolute position of each point towards a surface reference, the survey also provides an absolute orientation of any oriented measurement with respect to up-down (gravity) and north-south (magnetism). The uncertainty in the transmitter and receiver positions from these surveys can be entered in the survey inversion processes as unknowns in addition to the unknown formation parameters (compressional and/or shear slowness for seismic surveys, electric conductivity—and maybe magnetic permeability—for electric surveys).

B. R. Spies, Survey Design Considerations for Cross-Well Electromagnetics, 1992 Annual SEG Meeting, New Orleans, observes that very low frequency electromagnetic signals contain no information on the conductivity of the formation and proposes that such signals could be used to calibrate the field system and possibly correct for errors in the source-receiver geometry.

It is an object of the present invention to provide a technique for determining the relative vector-valued distance and orientation between the transmitters and receivers without reference to the surrounding formation.

SUMMARY OF THE INVENTION

The present invention broadly provides a method of determining alignment of first and second parts of a borehole tool system in which orthogonal signals are transmitted by a transmitter in the first tool part and each signal is received and measured in orthogonal directions at a receiver in the second tool part, the components of each signal in the orthogonal directions at the receiver being used to determine the alignment of the first and second parts.

Apparatus for determining alignment of first and second tool parts in a borehole tool system comprises a transmitter in the first tool part which transmits orthogonal signals, a receiver in the second tool part which receives and measures each signal in orthogonal directions, and means for determining on the basis of the components of each signal in the orthogonal directions, the alignment of the first and second tool parts.

Preferably, three mutually orthogonal signals are used although it may be possible to use only two signals in certain circumstances.

The present invention also comprises a method of characterizing an underground formation in which the alignment of the first and second tool parts is determined and formation evaluation signals are transmitted between the first and second tool parts and the formation characterized are the basis of the received formation evaluation signals. The formation evaluation signals can typically be electromagnetic or acoustic signals.

The broadest scope of the present invention measures the alignment directly, and by suitable combination with the indirect, but absolute measurements can be used to reduce alignment errors.

The first and second tool parts typically include formation measurement devices such as transmitters and receivers for electromagnetic or acoustic signals. When these transmitters and receivers are rigidly connected to the first and second tool parts, their relative positions can be determined using the present invention.

The transmitter preferably transmits electromagnetic signals which are unaffected by the properties of the underground formation through which they must pass to reach the receiver. Such signals are typically ultra-low frequency signals, the frequency of which places the receiver in the near-field region of the transmitter. The signals preferably have a frequency in the 1 to 10 Hz range.

The transmitter can comprise three mutually perpendicular ultra-low frequency magnetic dipole radiators and the receiver can comprise a three-axis magnetometer.

A suitable transmitter uses a coil-capacitor (LC) circuit to provide the signal. This arrangement has the advantage that it can be the only circuitry required, with the capacitor acting as both an energy storage device as well as a component of the oscillator circuit which defines the frequency of the signal. The energy storage function is useful to be able to provide sufficient signal power for a good measurement to be made despite the power supply limitations typically encountered in borehole tools. The coil in the LC circuit acts as both a resonance partner for the capacitor to define the frequency and as the transmitting antenna. In one embodiment, three coils can be arranged to have mutually orthogonal axes and so as to provide the orthogonal signals. The dual roles of the capacitor and coils can allow simplified construction of a sonde for use in borehole logging.

It is possible to arrange that the only active elements are switches which trigger the discharge of the capacitors, otherwise the oscillation is passively excited. As an extension of this passively excited transmitter, the capacitor bank or the coil can be split, and the individual sub-circuits can be separately discharged. This splitting allows production of higher resonance frequencies.

BRIEF DESCRIPTION OF THE DRAWINGS

The present invention will now be described with reference to the accompanying drawings, in which.

DESCRIPTION OF THE PREFERRED EMBODIMENT

Figure 1:
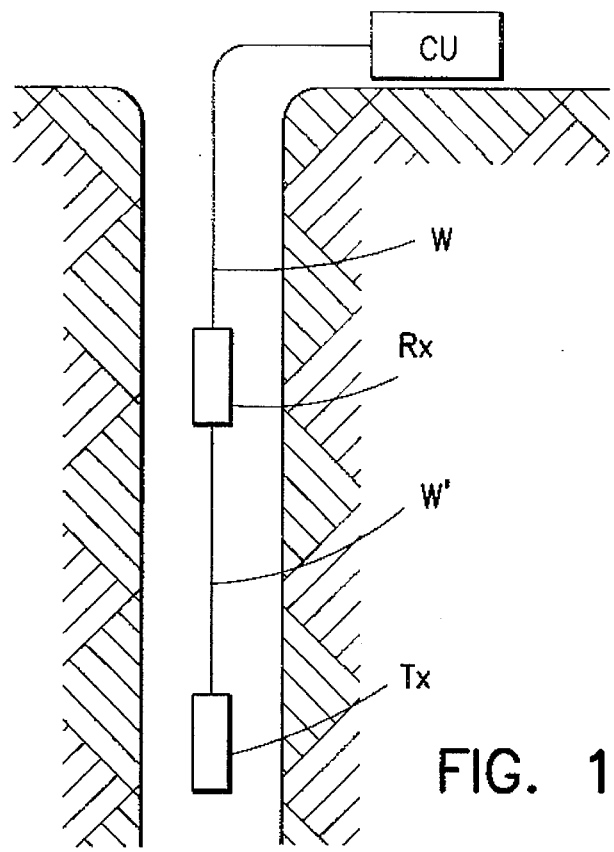
FIG. 1 shows a single-well deep electromagnetic logging apparatus.
Figure 2:
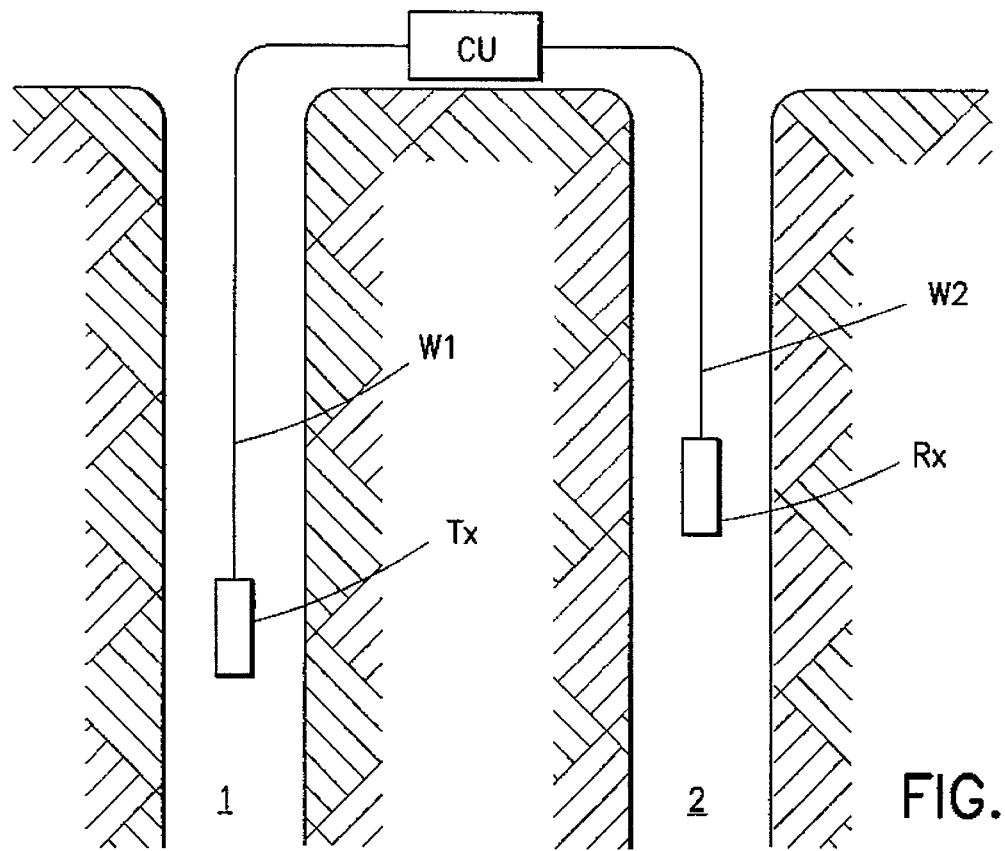
FIG. 2 shows a cross-well deep electromagnetic logging system.

The method and apparatus of the present invention find application in deep electromagnetic measurements made from within a single well or made between two wells. FIG. 1 shows a single well deep EM logging system which comprises a signal transmitter TX located at the end of a wireline cable W and a receiver RX located some distance from the transmitter TX on the cable. The transmitter TX and receiver RX are connected by means of a extended cable portion W'. The cable W extends to the surface where a control unit CU is located which allows control of the operation of the tool and recording and processing of the measurements made thereby. FIG. 2 shows a cross-well deep EM logging system which uses the same reference letters as in FIG. 1 to designate similar parts. In this case, the transmitter TX and the receiver RX are each suspended in different wells 1, 2 by means of cables W1 and W2 which are connected to the control unit CU. In order to analyze the measurements made by each system, it is necessary to know the relative alignment of the transmitter and receiver.

Figure 3:
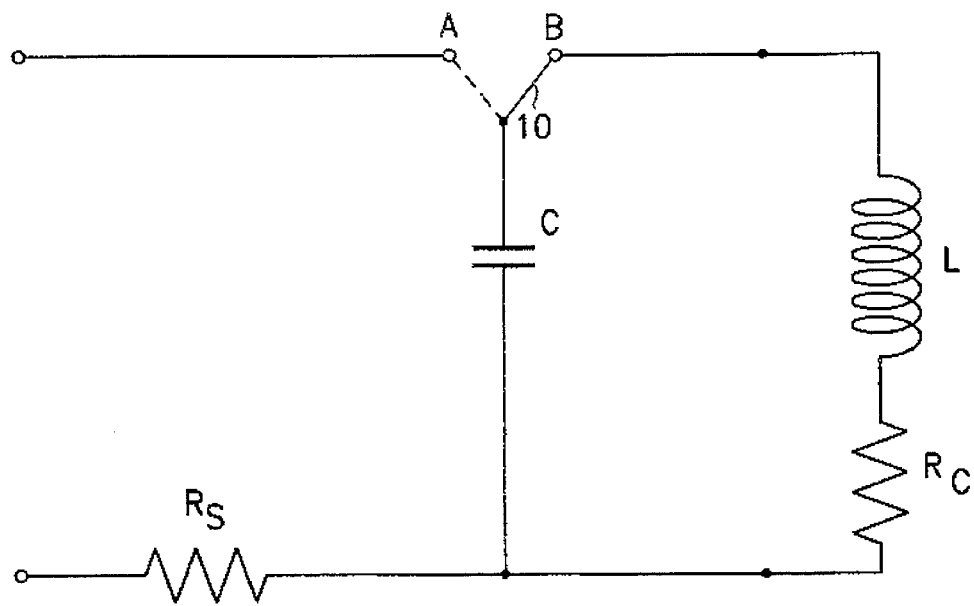
FIG. 3 shows a single-coil transmitter for use in the invention.

Power is supplied to the transmitter via the cable W. In a typical wireline logging system this power supply is limited to a maximum of 1 A at 500 V which corresponds to 500 W continuous power. This power may not be sufficient for a continuous signal transmission over long distances which even may cross a steel-casing wall. However, the transmitter can operate in a pulsed mode. As a pulsed source, the transmitter broadcasts much higher power over a short period of time and is be recharged over a dead-time interval. With 500 W continuous power, the energy available is 500 Ws or 500 J which can be stored in capacitor banks and periodically discharged to provide the more powerful signal. Once the capacitor is charged to a suitable level, it can be discharged through a coil to generate the signal. This is shown schematically in FIG. 3 which shows a single transmitter circuit for use in the present invention. With the switch 10 at position A, the capacitor C (100,000 μF) is connected to the power supply via the wireline cable. This supplies 1 A at 500 V, the cable having a typical resistance of 500 Ω (represented by resistor $R_s$ in FIG. 3). Once the capacitor is charged to a suitable voltage (450 V) it is discharged, with the switch at position B, through the coil L which has an inductance of 253 mH and ohmic resistance (represented as resistor $R_c$ in FIG. 3) 272 mΩ. In this state the circuit oscillates at a frequency of 1 Hz. Because of the large amount of charge stored in the capacitor, the discharge creates a large current which in turn results in a large magnetic dipole moment in the coil L. The coil L acts as a magnetic dipole transmitter with a large dipole moment $\vec{m}$. As will be described below, the coil is physically small compared to the transmission distances and can be considered as a magnetic point dipole.

Figure 4:
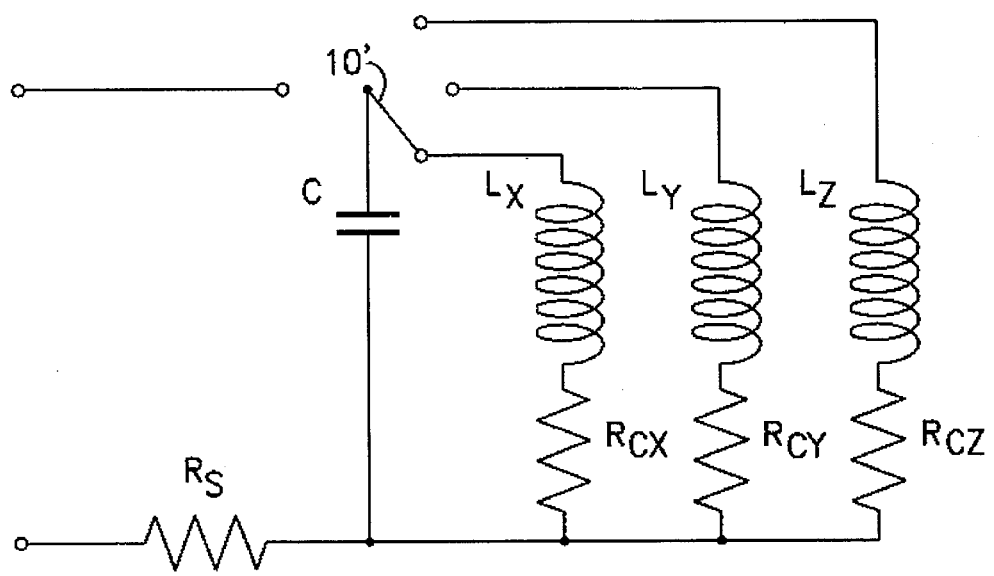
FIG. 4 shows one embodiment of a three-coil transmitter for use in the invention.
Figure 5:
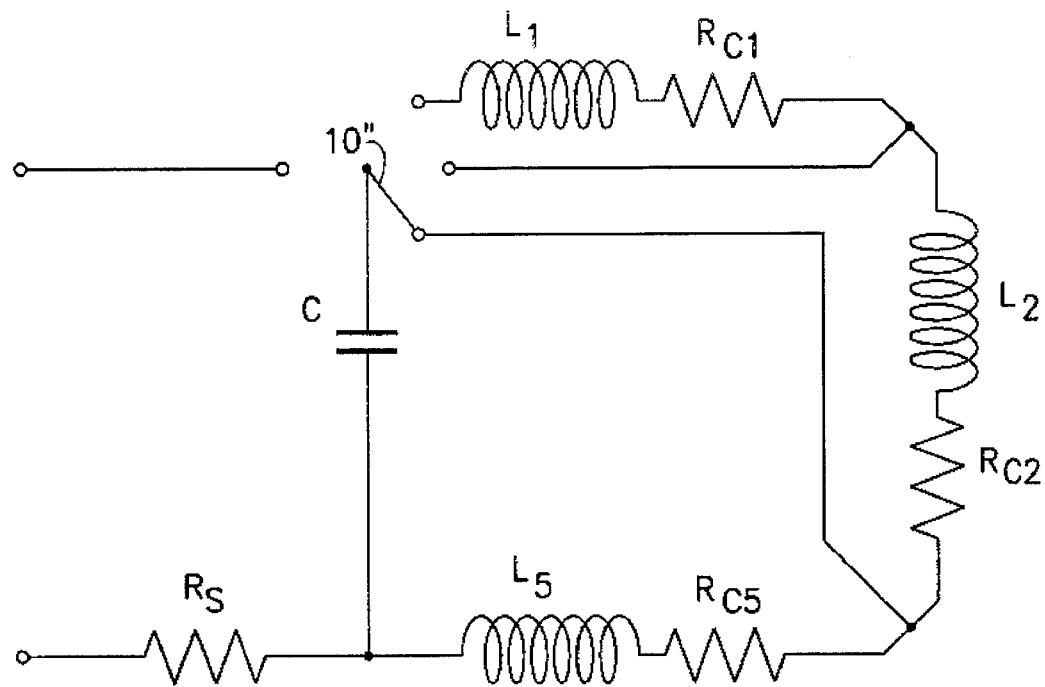
FIG. 5 shows another embodiment of a three-coil transmitter for use in the invention.

In order to achieve the desired signals for use in alignment according to the present invention, it is necessary to provide three transmitting antennas aligned along three mutually orthogonal axes. One suitable arrangement for this is shown in FIG. 4. The arrangement here is generally similar to that of FIG. 3 but instead of the single coil L there are now three coils $L_x$, $L_y$ and $L_z$ and the switch 10' is arranged such that each oil in turn can be connected to the capacitor C. The capacitor C is discharged through each coil in turn and is recharged between each discharge as before. It would also be possible to arrange a separate capacitor for each coil, if required.

Figure 6:
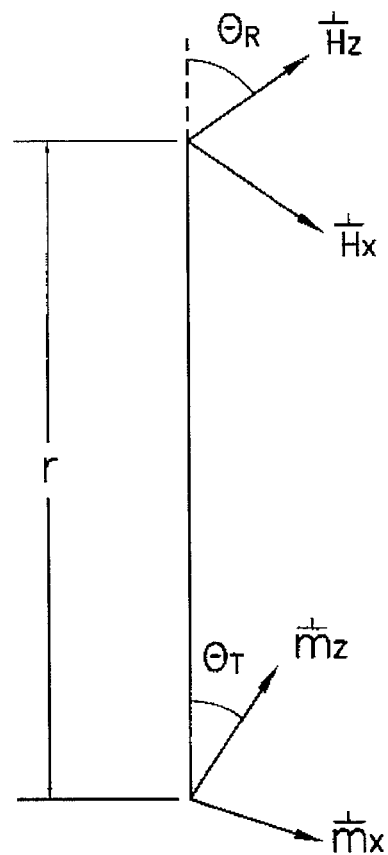
FIG. 6 shows a two-dimensional arrangement of biaxial transmitter and receiver sondes.

FIG. 6 shows an arrangement whereby several frequencies can be obtained. In this case, three capacitors L1, L2 and L5 are connected in series and the switch 10" is arranged such that the capacitor C can be connected across one, two or all three coils depending on the desired frequency. In a further alternative (not shown), there is only a single coil but the capacitor is split into two sections of equal or different capacitance. In this case, the switch is used to determine how many capacitor sections are connected to the coil, the number of sections, i.e. the capacitance, determining the frequency of the signal in each case.

Suitable wire material for the coil is copper with an electric resistivity of $\rho_{Cu} \approx 1.7$ μΩcm. The wire has a diameter of 2 mm. The damping effect of a circuit incorporating such a coil must be relatively small compared to the resonance effects of the circuit. The capacitance C is chosen as 0.1 F=100,000 μF, and since it is necessary that the resonance effect is larger than the damping effect, the ratio of the relative magnetic permeability $\mu_r$ of the core over axial coil length l (in m) should be at least 100/m. The ratio $l/\mu_r$= 1000/m could be accomplished by a 10 cm long ferromagnetic core with $\mu_r$=100. Since the coil must fit into a wireline tool housing, its radius is chosen as r=5 cm. In order for the coil the have the appropriate properties, 160 turns are required on the coil. Thus a coil with 160 turns of 2 mm-diameter wire would require four layers covering 8 cm of the 10 cm long core. This leads to a reasonably dimensioned coil. The individual parameters may be changed according to the available materials and their change of properties under heat and pressure. In particular, the increase of electrical resistivity ρ and the fluctuation of the magnetic permeability $\mu_r$, with temperature may cause unwanted distortions.

The inductance L of this coil is approximately 253 mH and the resistance $R_c$ of the coil is approximately 0.272 Ω. The explicit values for C, L and $R_c$ correctly produce the 1 Hz-resonance frequency with an effective damping of 1/1.86 s. The Q-value of this damped resonance is approximately 5.84. This allows for almost two oscillations before the amplitude is attenuated to 1/e. If even weaker damping is desired, the magnetic permeability of the core material $\mu_r$ can be increased. At the same time, the coil can be shortened. Instead of four layers, several more layers can be stacked to reduce the length l and thus increase the ratio $\mu_r/l$. Such a modification will also reduce the required number of turns because the inductive effect grows quadratically with $\mu_r/l$ while the capacitive effect grows only linearly. The number of turns N for the coil is thus approximately inversely proportional to the square root of the ratio $\mu_r/l$.

The current amplitude $I_0$ is limited by the complex impedance $R_c+i\omega_0 L$ of the coil. With a charge-up voltage $U_{c0}$=450 V, Ohm's law gives $$I_0 = \frac{U_{c0}}{R_c + i\omega_0^2 L^2} \approx 279A(0.168 - 0.986i)$$

This very large current lasts only for a few seconds during which it discharges to 10 kJ of stored energy. The current creates a magnetic field H inside the coil which is in the long-solenoid approximation:

$$H = |I_0|\frac{N}{l} \approx 447 \frac{kA}{m}$$

The magnetic induction B is related to the magnetic field H by B=μH. With the large value of N and the low resonance frequency, the ferromagnetic core may become magnetically saturated so that the magnetic permeability shows nonlinear effects. The magnetic dipole moment m for a coil without ferromagnetic core is given by:

$$\vec{m} = I_0 N\pi r^2 \approx 350 \, Am^2$$

The ferromagnetic core does not change the magnetic field H inside the core. Thus, the magnetic induction B is increased by a factor $\mu_r$ the relative magnetic permeability of the core. The magnetic induction $\vec{B}$ is perpendicular to the end faces of the cylindrical core and continuous across this interface into the surrounding medium with $\mu=\mu_0\mu_{air}$. Thus, the magnetic field H increases by a factor $\mu_r/\mu_{air}$ outside the ferromagnetic core. By the same token, the magnetic dipole moment $\vec{m}$ increases by this factor $\mu_r/\mu_{air}$. With $\mu_r$=100, the magnetic dipole moment becomes:

$$\vec{m} = I_0 \frac{\mu_r}{\mu_{air}} N\pi r^2 \approx 35 kAm^2$$

This dipole moment represents the transmitter strength. To increase the transmitter strength the number of turns in the coil could be increased. This increase would also increase the inductance L and the Ohmic resistance $R_c$ of the coil and thus reduce the resonance frequency and the current. Consequently, the capacitance must be decreased and the voltage $U_{c0}$ in the capacitor bank must be increased with a transformer. The total energy storage should remain constant.

The magnetic point-dipole transmitter with a dipole moment $\vec{m}$ generates a magnetic field $\vec{H}$. The receiver measures the vector-valued magnetic field at a distance of about 100 m from the transmitter. The single-Hertz frequency puts the receiver in the near field of the transmitter whose field strength falls off like $1/r^3$. With a transmitter dipole strength of 35 $kAm^2$, the magnetic field 100 m away is a few nT (nanoTesla). Thus, the receiver must be able to directly measure the triaxial magnetic field $\vec{H}$ (rather than the time derivative $\partial_t\vec{H}$) with an accuracy of about 0.1 nT. Flux-gate magnetometers are available which meet this accuracy criterion and which provide a triaxial measurement of the magnetic field. Among the classical magnetometers, these flux-gate sensors are the preferred method of measurement. A more recent technological development offers high-$T_c$ superconducting quantum interference devices (SQUIDs) as very accurate triaxial magnetometers. These magnetometers are far superior to even flux-gate sensors but have the disadvantage of requiring cryo-cooling in a downhole sonde.

The present invention also comprises a method of determining alignment between the transmitter and receiver. With the arrangement of FIG. 4, the time to charge the capacitor to a suitable level using a power supply of the type common in borehole logging tools is typically of the order of 2 minutes. Once the capacitor is charged, it is discharged through the coil $L_x$ and the components of the signal produced are detected and measured along the three axes of the receiver. This is then repeated with the capacitor being discharged through coil $L_y$ and again through coil $L_z$. Thus for each transmitter signal $T_x$, $T_y$ and $T_z$, there will be three receiver signals $R_{xx}$, $R_{xy}$, $R_{xz}$, and $R_{yx}$, $R_{yy}$, $R_{yz}$ and $R_{zx}$, $R_{zy}$, $R_{zz}$. The relative alignment of the transmitter and receiver can then be determined from these measurements.

For the ultra-low frequency measurements in the near field of the transmitter, the observed magnetic field $\vec{H}$ of the magnetic point dipole $\vec{m}$ at a point $\vec{r}=(x,y,z)$ is given by:

$$\vec{H} = \frac{3\hat{n}(\vec{m}\cdot\hat{n}) - \vec{m}}{4\pi r^3} \quad (1)$$

where $r = \sqrt{x^2 + y^2 + z^2}$ and $\hat{n} \equiv \vec{r}/r$.

Choosing a Cartesian (x,y,z) coordinate system with the transmitter at the origin, the x, y, and z axes are defined by the corresponding dipole moments:

$$\vec{m}_x = m_x \vec{e}_x$$

$$\vec{m}_y = m_y \vec{e}_y$$

$$\vec{m}_z = m_z \vec{e}_z \quad (2)$$

The measurement cycle consists of three triaxial magnetic-field measurements which yield the three field vectors:

$$\vec{H}_x = \frac{3\hat{n}(\vec{m}_x \cdot \hat{n}) - \vec{m}_x}{4\pi r^3} \quad (3)$$

$$\vec{H}_y = \frac{3\hat{n}(\vec{m}_y \cdot \hat{n}) - \vec{m}_y}{4\pi r^3}$$

$$\vec{H}_z = \frac{3\hat{n}(\vec{m}_z \cdot \hat{n}) - \vec{m}_z}{4\pi r^3}$$

Superficially, these measurements have 3×3 values which determine nine unknowns: three for the magnitude and orientation of the transmitter dipole moments, three for the absolute distance and direction between the transmitter and receiver and three for the receiver sensor orientation and dipole moments. However, this problem in fact has only six independent unknowns. The absolute distance r and the direction between the transmitter and receiver remain three unknowns. In addition, the orientation of the triaxial receiver sensor in the transmitter Cartesian coordinate system offers three more unknowns. The Cartesian coordinate system is chosen such that the three transmitter dipoles determine the Cartesian coordinate axes. The source dipole strength is directly monitored and thus is known which eliminates the first three unknowns. At the same time, only the absolute magnitude of one magnetic field vector in equation (3) must be known together with the relative strength of the magnetic dipole moments $m_x$, $m_y$ and $m_z$. The other two field amplitudes are then related to the first by equations (3) and provide the receiver orientation.

One of the unknowns, the absolute distance r, is readily determined from equation (3). The Cartesian coordinates are rewritten in terms of spherical coordinates with the azimuthal angle $\phi$ and the zenith angle $\theta$.

$$\vec{r} = r\sin\theta\cos\phi\vec{e}_x + r\sin\theta\sin\phi\vec{e}_y + r\cos\theta\vec{e}_z \quad (4)$$
$$\hat{n} = \sin\theta\cos\phi\vec{e}_x + \sin\theta\sin\phi\vec{e}_y + \cos\theta\vec{e}_z$$

$$\vec{m}_x \cdot \hat{n} = m_x\sin\theta\cos\phi \quad (5)$$
$$\vec{m}_y \cdot \hat{n} = m_y\sin\theta\sin\phi$$
$$\vec{m}_z \cdot \hat{n} = m_z\cos\theta$$

The absolute distance r is obtained by square-adding all three magnetic-field measurements, normalized by the respective source strengths:

$$\frac{1}{m_x^2}\vec{H}_x \cdot \vec{H}_x + \frac{1}{m_y^2}\vec{H}_y \cdot \vec{H}_y + \frac{1}{m_z^2}\vec{H}_z \cdot \vec{H}_z = \frac{1}{16\pi^2 r^6}(3\sin^2\theta\cos^2\phi + 1 + 3\sin^2\theta\sin^2\phi + 1 + 3\cos^2\theta + 1) \quad (6)$$
$$= \frac{3}{8\pi^2 r^6}$$

This identity readily provides the absolute distance r from the three measurements.

Equivalently, the determinant of the three magnetic-field vectors provides an identity for r:

$$|\vec{H}_x, \vec{H}_y, \vec{H}_z| = \vec{H}_x \cdot (\vec{H}_y \times \vec{H}_z) = \frac{1}{64\pi^3 r^9}(3\hat{n}(\vec{m}_x \cdot \hat{n}) - \vec{m}_x) \cdot [(3\hat{n}(\vec{m}_y \cdot \hat{n}) - \vec{m}_y) \times (3\hat{n}(\vec{m}_z \cdot \hat{n}) - \vec{m}_z)] \quad (7)$$
$$= \frac{m_x m_y m_z}{64\pi^3 r^9}(3\hat{n}(\vec{e}_x \cdot \hat{n}) - \vec{e}_x) \cdot (3(\vec{e}_z \times \hat{n})(\vec{e}_y \cdot \hat{n}) + 3(\hat{n} \times \vec{e}_y)(\vec{e}_z \cdot \hat{n}) + \vec{e}_x) -$$
$$\frac{m_x m_y m_z}{64\pi^3 r^9}(3(\vec{e}_x \cdot \hat{n})^2 - 1 - 3(\vec{e}_y \cdot \hat{n})\vec{e}_x \cdot (\vec{e}_z \times \hat{n}) + 3(\vec{e}_z \cdot \hat{n})\vec{e}_x \cdot (\vec{e}_y \times \hat{n}))$$

Both identities (6) and (7) are scalars and thus remain invariant under rotations of the receiver sonde, i.e. they are independent of the sonde orientation.

After the distance r has been determined, the observed magnetic fields are normalized:

$$\vec{H}_x \to \vec{h}_x \equiv \frac{4\pi r^3}{m_x}\vec{H}_x = 3\hat{n}(\vec{e}_x \cdot \hat{n}) - \vec{e}_x \quad (8)$$
$$\vec{H}_y \to \vec{h}_y \equiv \frac{4\pi r^3}{m_y}\vec{H}_y = 3\hat{n}(\vec{e}_y \cdot \hat{n}) - \vec{e}_y$$
$$\vec{H}_z \to \vec{h}_z \equiv \frac{4\pi r^3}{m_z}\vec{H}_z = 3\hat{n}(\vec{e}_z \cdot \hat{n}) - \vec{e}_z$$

These normalized fields contain only the unknown information about the direction between transmitter and receiver and the orientation of the receiver sonde. The two invariants from equations (6) and (7) which determined the transmitter-receiver distance become with the normalized fields:

$$\vec{h}_x \cdot \vec{h}_x + \vec{h}_y \cdot \vec{h}_y + \vec{h}_z \cdot \vec{h}_z = 6 \quad (6'')$$

$$|\vec{h}_x, \vec{h}_y, \vec{h}_z| = \vec{h}_x \cdot (\vec{h}_y \times \vec{h}_z) = 2 \quad (7''),$$

These normalized identities may serve either as quality control for the distance-r inversion or may serve to separate the measurement of the distance r from the orientation measurements.

At this point, it is more advantageous to change the coordinate system. Now the direction from the transmitter to the receiver is chosen as z-axis. Thus, the emphasis is shifted from the unknown transmitter-receiver direction to the unknown orientation of the triaxial transmitter sonde. This shift puts the transmitter and receiver on the same footing. This shift also emphasizes an additional invariant of the system: a simultaneous rotation of transmitter and receiver sondes around the z-axis does not change the signals from either of the three transmitter dipoles into either of the three receiver detectors.

In general, the triaxial transmitter and receiver sondes are tilted against the z-axis by some zenith angles $\theta_T$, $\theta_R$ and azimuth angles $\phi_T$, $\phi_R$. Just as equation (5) described the tilt of the transmitter-receiver direction with respect to the transmitter triaxial sonde, the sondes' tilt is described by the inverse rotation.

This geometry and the inversion of the measurements is first illustrated by a simplified, two-dimensional example. It is assumed that the transmitter x- and z-dipoles and the receiver x- and z-sensors lie in the x-z-plane. The y-components are perpendicular to the plane and are ignored in the simplified analysis. Within the x-z-plane, the dipoles generate magnetic fields with only x- and z-components, i.e., the fields are co-planar which is readily seen from the field expressions (3).

The transmitter and receiver sondes are horizontally aligned—they both lie on the z-axis. The transmitter z-dipole is tilted off the z-axis by an angle $\theta_T$, and the receiver z-sensor is tilted off the z-axis by an angle $\theta_R$. (This configuration is illustrated in FIG. 6). A linear combination $\vec{m}'_z$ of the x- and z-dipoles parallel to the z-axis can now be constructed, and the complementary combination $\vec{m}'_x$ perpendicular to the z-axis $$\vec{m}'_z = \vec{m}_x \sin\theta_T + \vec{m}_z \cos\theta_T = m\vec{e}_z$$

$$\vec{m}'_x = \vec{m}_x \cos\theta_T - \vec{m}_z \sin\theta_T = m\vec{e}_x \quad (9)$$

The aligned dipoles generate normalized magnetic fields according to equations (8):

$$\vec{h}'_x = \vec{h}'_{xx}\vec{e}_x = \vec{h}'_{xz}\vec{e}_z = -\vec{e}_x$$

$$\vec{h}'_z = \vec{h}'_{zx}\vec{e}_x = \vec{h}'_{zz}\vec{e}_z = 2\vec{e}_z \quad (10)$$

or $$\vec{h}'_{xx} = -1$$

$$\vec{h}'_{xz} = 0$$

$$\vec{h}'_{zx} = 0$$

$$\vec{h}'_{zz} = 2 \quad (11)$$

With the dipole strength m normalized out, the tilted dipole moments are written in terms of the tilt angle:

$$\vec{m}_x = \vec{e}_x \cos\theta_T - \vec{e}_z \sin\theta_T$$

$$\vec{m}_z = \vec{e}_x \sin\theta_T + \vec{e}_z \cos\theta_T \quad (12)$$

The normalized magnetic fields from equations (8) become with these tilted dipoles:

$$\vec{h}_x = 3\vec{e}_z \sin\theta_T - \vec{e}_z \sin\theta_T + \vec{e}_z \cos\theta_T = 2\vec{e}_z \sin\theta_T + \vec{e}_z \cos\theta_T$$

$$\vec{h}_z = 3\vec{e}_z \sin\theta_T - \vec{e}_z \sin\theta_T - \vec{e}_z \cos\theta_T = 2\vec{e}_z \cos\theta_T - \vec{e}_x \sin\theta_T \quad (13)$$

The receiver sonde measures these two two-component magnetic fields with a tilt angle $\theta_R$. To determine the magnetic fields in this rotated observation system, the field vectors must be rotated by the angle $-\theta_R$:

$$\vec{h}_x = \begin{pmatrix} \cos\theta_T \\ 2\sin\theta_T \end{pmatrix} \rightarrow \begin{pmatrix} \cos\theta_R & -\sin\theta_R \\ \sin\theta_R & \cos\theta_R \end{pmatrix} \begin{pmatrix} \cos\theta_T \\ 2\sin\theta_T \end{pmatrix} = \quad (14)$$

$$\begin{pmatrix} \cos\theta_T \cos\theta_R - 2\sin\theta_T \sin\theta_R \\ \cos\theta_T \sin\theta_R + 2\sin\theta_T \cos\theta_R \end{pmatrix}$$

$$\vec{h}_z = \begin{pmatrix} -\sin\theta_T \\ 2\cos\theta_T \end{pmatrix} \rightarrow \begin{pmatrix} \cos\theta_R & -\sin\theta_R \\ \sin\theta_R & \cos\theta_R \end{pmatrix} \begin{pmatrix} -\sin\theta_T \\ 2\cos\theta_T \end{pmatrix} =$$

$$\begin{pmatrix} -\sin\theta_T \cos\theta_R - 2\cos\theta_T \sin\theta_R \\ -\sin\theta_T \sin\theta_R + 2\cos\theta_T \cos\theta_R \end{pmatrix}$$

These identities describe the measured and normalized magnetic-field components in terms of the unknown tilt angles $\theta_T$ and $\theta_R$. Combining the $h_{xx}$ and $h_{zz}$ components and the $h_{xz}$ and $h_{zx}$ components gives simple expressions for these angles:

$$h_{xz} - h_{zx} = 3(\sin\theta_T \cos\theta_R + \cos\theta_T \sin\theta_R) = 3\sin(\theta_T + \theta_R)$$

$$h_{xz} + h_{zx} = \sin\theta_T \cos\theta_R - \cos\theta_T \sin\theta_R = \sin(\theta_T - \theta_R)$$

$$h_{xx} + h_{zz} = -\cos\theta_T \cos\theta_R - \sin\theta_T \sin\theta_R = -\cos(\theta_T - \theta_R)$$

$$h_{xx} - h_{zz} = -3(\cos\theta_T \cos\theta_R + \sin\theta_T \sin\theta_R) = -3\cos(\theta_T + \theta_R) \quad (15)$$

which give two relations for tilt angles:

$$\theta_T + \theta_R = \arcsin\left(\frac{h_{xz} - h_{zx}}{3}\right) = \arccos\left(\frac{h_{zz} - h_{xx}}{3}\right) \quad (16)$$

$$\theta_T - \theta_R = \arcsin(h_{xz} + h_{zx}) = \arccos(-h_{xx} - h_{zz})$$

The redundancy in these two independent identities offers an accuracy control for the measurement data.

This simplified example illustrates in two dimensions the inversion procedure for the orientations of the transmitter and receiver biaxial sondes. It also provides identities for the orientation angles $\theta_T$ and $\theta_R$ together with redundancies in their measurements. The same procedure is now applied to the three-dimensional case with triaxial transmitter and receiver sondes.

The Cartesian coordinate system is chosen such that the transmitter and receiver sondes are horizontally aligned—they both lie on the z-axis. The transmitter z-dipole is tilted off the z-axis by a zenith angle $\theta_T$ and is rotated out of the x-z-plane by an azimuthal angle $\phi_T$. Even after the z-dipole is rotated back to the z-axis by $\theta_T$ and $\phi_T$, the x- and y-axis are still rotated off the x-y-axes by an angle $\psi_T$, the nadir angle. These are the three Euler angles for the transmitter triaxial sonde. The combined Euler angles constitute a general rotation in three dimensions:

$$\begin{pmatrix} \cos\psi_T & -\sin\psi_T & 0 \\ \sin\psi_T & \cos\psi_T & 0 \\ 0 & 0 & 1 \end{pmatrix} \begin{pmatrix} \cos\theta_T & 0 & -\sin\theta_T \\ 0 & 1 & 0 \\ \sin\theta_T & 0 & \cos\theta_T \end{pmatrix} \begin{pmatrix} \cos\phi_T & \sin\phi_T & 0 \\ -\sin\phi_T & \cos\phi_T & 0 \\ 0 & 0 & 1 \end{pmatrix} = \quad (17)$$

$$\begin{pmatrix} \cos\theta_T \cos\psi_T \cos\phi_T + \sin\psi_T \sin\phi_T & \cos\theta_T \cos\psi_T \cos\phi_T - \sin\psi_T \cos\phi_T & -\sin\theta_T \cos\psi_T \\ \cos\theta_T \sin\psi_T \cos\phi_T - \cos\psi_T \sin\phi_T & \cos\theta_T \sin\psi_T \sin\phi_T + \cos\psi_T \cos\phi_T & -\sin\theta_T \sin\psi_T \\ \sin\theta_T \cos\phi_T & \sin\theta_T \sin\phi_T & \cos\theta_T \end{pmatrix}$$

The columns of this matrix now yield those linear combinations $\vec{m}'_x$, $\vec{m}'_y$, $\vec{m}'_z$ of the three transmitter dipoles which are aligned with the chosen coordinate system:

$$\vec{m}'_x = m\vec{e}'_x = \vec{m}_x(\cos\theta_T \cos\psi_T \cos\phi_T + \sin\psi_T \sin\phi_T) + \vec{m}_y(\cos\theta_T \sin\psi_T \cos\phi_T - \cos\psi_T \sin\phi_T) + \vec{m}_z \sin\phi_T \cos\phi_T$$

$$\vec{m}'_y = m\vec{e}'_y = \vec{m}_x(\cos\theta_T \cos\psi_T \sin\phi_T - \sin\psi_T \sin\phi_T) + \vec{m}_y(\cos\theta_T \sin\psi_T \sin\phi_T - \cos\psi_T \cos\phi_T) + \vec{m}_z \sin\theta_T \cos\phi_T$$

$$\vec{m}'_z = m\vec{e}'_z = \vec{m}_x \sin\theta_T \cos\psi_T - \vec{m}_y \sin\theta_T \sin\psi_T + \vec{m}_z \cos\theta_T \quad (18)$$

while the rows of the matrix in equation (17) yield the tilted dipole moments in terms of the chosen Cartesian coordinate system because the rotation matrix is orthogonal, i.e. its transpose is its inverse.

In the z-direction of the transmitter-receiver alignment, these aligned dipoles generate normalized magnetic fields according to equations (8):

$$\vec{h}'_x = \vec{h}'_{xx}\vec{e}_x + \vec{h}'_{xy}\vec{e}_y + \vec{h}'_{xz}\vec{e}_z = -\vec{e}_x$$

$$\vec{h}'_y = \vec{h}'_{yx}\vec{e}_x + \vec{h}'_{yy}\vec{e}_y + \vec{h}'_{yz}\vec{e}_z = -\vec{e}_y$$

$$\vec{h}'_z = \vec{h}'_{zx}\vec{e}_x + \vec{h}'_{zy}\vec{e}_y + \vec{h}'_{zz}\vec{e}_z = 2\vec{e}_z \quad (19)$$

or $h_{xx} = h_{yy} = -1$ and $h_{zz} = 2$ while all other components vanish. These components fulfill equations (6') and (7').

$$\vec{h}_x \cdot \vec{h}_x + \vec{h}_y \cdot \vec{h}_y + \vec{h}_z \cdot \vec{h}_z = h^2_{xx} + h^2_{yy} + h^2_{zz} = 6 \qquad (6'')$$

$$|\vec{h}_x, \vec{h}_y, \vec{h}_z| = \vec{h}_x \cdot (\vec{h}_y \times \vec{h}_z) = h_{xx} h_{yy} h_{zz} = 2 \qquad (7''),$$

With the dipole strength normalized out, the tilted dipole moments are written in terms of the transmitter zenith, azimuth and nadir angles:

$$\vec{m}_x = \vec{e}_x(\cos\theta_T \cos\psi_T \cos\phi_T + \sin\psi_T \sin\phi_T) + \vec{e}_y(\cos\theta_T \cos\psi_T$$
$$\sin\phi_T - \sin\psi_T \cos\phi_T) + \vec{e}_z \sin\theta_T \cos\psi_T$$

$$\vec{m}_x = \vec{e}_x(\cos\theta_T \sin\psi_T \cos\phi_T - \cos\psi_T \sin\phi_T) + \vec{e}_y(\cos\theta_T \sin\psi_T \sin\phi_T$$
$$\phi_T + \cos\psi_T \cos\phi_T) - \vec{e}_z \sin\theta_T \sin\psi_T$$

$$\vec{m}_z = \vec{e}_x \sin\theta_T \cos\phi_T + \vec{e}_y \sin\theta_T \sin\phi_T + \vec{e}_z \cos\theta_T \qquad (20)$$

The normalized fields for these tilted dipoles become with equations (8):

$$\vec{h}_x = -3\vec{e}_z\sin\theta_T\cos\psi_T - \vec{e}_x(\cos\theta_T\cos\psi_T\cos\phi_T + \sin\psi_T\sin\phi_T) - \qquad (21)$$
$$\vec{e}_y(\cos\theta_T\cos\psi_T\sin\phi_T - \sin\psi_T\cos\phi_T) + \vec{e}_z\sin\theta_T\cos\psi_T$$
$$= -2\vec{e}_z\sin\theta_T\cos\psi_T - \vec{e}_x(\cos\theta_T\cos\psi_T\cos\phi_T + \sin\psi_T\sin\phi_T) -$$
$$\vec{e}_y(\cos\theta_T\cos\psi_T\sin\phi_T - \sin\psi_T\cos\phi_T)$$

$$\vec{h}_x = -3\vec{e}_z\sin\theta_T\cos\psi_T - \vec{e}_x(\cos\theta_T\sin\psi_T\cos\phi_T - \cos\psi_T\sin\phi_T) -$$
$$\vec{e}_y(\cos\theta_T\sin\psi_T\sin\phi_T + \cos\psi_T\cos\phi_T) + \vec{e}_z\sin\theta_T\sin\psi_T$$
$$= -2\vec{e}_z\sin\theta_T\sin\psi_T - \vec{e}_x(\cos\theta_T\sin\psi_T\cos\phi_T - \cos\psi_T\sin\phi_T) -$$
$$\vec{e}_y(\cos\theta_T\sin\psi_T\sin\phi_T + \cos\psi_T\cos\phi_T)$$

$$\vec{h}_z = 3\vec{e}_z\cos\theta_T - \vec{e}_x\sin\theta_T\cos\phi_T - \vec{e}_y\sin\theta_T\sin\phi_T - \vec{e}_z\cos\theta_T$$
$$= 2\vec{e}_z\cos\theta_T - \vec{e}_x\sin\theta_T\cos\phi_T - \vec{e}_y\sin\theta_T\sin\phi_T; \text{ and,}$$

The receiver sonde measures these three three-component magnetic fields with similarly tilt angles. The z-sensor is tilted off the z-axis by a zenith angle $\theta_R$ and is rotated out of the x-z-plane by an azimuthal angle $\phi_R$. After aligning the z-sensor with the z-axis, the x- and y-sensors are rotated off the x-y-axes by the nadir angle $\psi_R$. These are the three Euler angles for the receiver triaxial sonde. To determine the magnetic field components in this rotated observation system the field vectors must be rotated by the inverse—or transposed—matrix to the rotation matrix in equation (17), parametrized by $\psi_R$, $\theta_R$ and $\phi_R$.

$$\begin{pmatrix} \cos\theta_R \cos\psi_R \cos\phi_R + \sin\psi_R \sin\phi_R & \cos\theta_R \cos\psi_R \cos\phi_R - \cos\psi_R \sin\phi_R & \sin\theta_R \cos\phi_R \\ \cos\theta_R \cos\psi_R \sin\phi_R - \sin\psi_R \cos\phi_R & \cos\theta_R \sin\psi_R \sin\phi_R + \cos\psi_R \cos\phi_R & \sin\theta_R \sin\phi_R \\ -\sin\theta_R \cos\phi_R & -\sin\theta_R \sin\psi_R & \cos\theta_R \end{pmatrix} \qquad (17')$$

These expressions are easier to understand if the rotation matrix of the three Euler angles in equation (17) is kept factored. In this form, the three magnetic-field vectors $\vec{h}_x$, $\vec{h}_y$, $\vec{h}_z$, are combined as covariant (row) vectors into a 3×3 matrix.

$$\begin{pmatrix} \vec{h}_x \\ \vec{h}_y \\ \vec{h}_z \end{pmatrix} = \begin{pmatrix} h_{xx} & h_{xy} & h_{xz} \\ h_{yx} & h_{yy} & h_{yz} \\ h_{zx} & h_{zy} & h_{zz} \end{pmatrix} \qquad (22)$$

The three dipole moments $\vec{m}_x$, $\vec{m}_y$, $\vec{m}_z$ are similarly combined as contravariant (column) vectors into a 3×3 matrix.

$$(\vec{m}_x, \vec{m}_y, \vec{m}_z) = \begin{pmatrix} \vec{m}_{xx} & \vec{m}_{xy} & \vec{m}_{xz} \\ \vec{m}_{yx} & \vec{m}_{yy} & \vec{m}_{yz} \\ \vec{m}_{zx} & \vec{m}_{zy} & \vec{m}_{zz} \end{pmatrix} \qquad (23)$$

The axis-aligned dipoles are normalized to unity which reduces the m-matrix in equation (22) to the 3×3 unit matrix. The transmitter-receiver direction $\hat{n}$ defines the z-direction. Then the dipole-field expression is written in matrix form:

$$3\hat{n}(\hat{n} \cdot \vec{m}) - \vec{m} = \begin{pmatrix} -1 & 0 & 0 \\ 0 & -1 & 0 \\ 0 & 0 & 2 \end{pmatrix} \qquad (24)$$

If the transmitter and receiver triaxial sondes are aligned with each other and with the z-axis, the dipole filed expressions would simply be given by:

$$\begin{pmatrix} h_{xx} & h_{xy} & h_{xz} \\ h_{yx} & h_{yy} & h_{yz} \\ h_{zx} & h_{zy} & h_{zz} \end{pmatrix} = \begin{pmatrix} -1 & 0 & 0 \\ 0 & -1 & 0 \\ 0 & 0 & 2 \end{pmatrix} \begin{pmatrix} 1 & 0 & 0 \\ 0 & 1 & 0 \\ 0 & 0 & 1 \end{pmatrix} \qquad (25)$$

as is shown in equation (19).

For generally misaligned transmitter and receiver triaxial sondes, the rotation matrices with the three Euler angles from equation (17) and (17') are inserted into equation (25). The inverse transmitter alignment rotation is inserted between the unit m-matrix and the dipole-field matrix, while the receiver alignment rotation is applied on the left of the dipole-field matrix.

$$\begin{pmatrix} h_{xx} & h_{xy} & h_{xz} \\ h_{yx} & h_{yy} & h_{yz} \\ h_{zx} & h_{zy} & h_{zz} \end{pmatrix} = \qquad (26)$$

$$\begin{pmatrix} \cos\psi_R & -\sin\psi_R & 0 \\ \sin\psi_R & \cos\psi_R & 0 \\ 0 & 0 & 1 \end{pmatrix} \begin{pmatrix} \cos\theta_R & 0 & -\sin\theta_R \\ 0 & 1 & 0 \\ \sin\theta_R & 0 & \cos\theta_R \end{pmatrix} *$$

$$\begin{pmatrix} \cos\phi_R & \sin\phi_R & 0 \\ \sin\phi_R & \cos\phi_R & 0 \\ 0 & 0 & 1 \end{pmatrix} \begin{pmatrix} -1 & 0 & 0 \\ 0 & -1 & 0 \\ 0 & 0 & 2 \end{pmatrix} \begin{pmatrix} \cos\phi_T & \sin\phi_T & 0 \\ \sin\phi_T & \cos\phi_T & 0 \\ 0 & 0 & 1 \end{pmatrix} *$$

-continued $$\begin{pmatrix} \cos\theta_T & 0 & \sin\theta_T \\ 0 & 1 & 0 \\ -\sin\theta_T & 0 & \cos\theta_T \end{pmatrix} \begin{pmatrix} \cos\psi_T & \sin\psi_T & 0 \\ -\sin\psi_T & \cos\psi_T & 0 \\ 0 & 0 & 1 \end{pmatrix} \begin{pmatrix} 1 & 0 & 0 \\ 0 & 1 & 0 \\ 0 & 0 & 1 \end{pmatrix}$$

The nine magnetic field measurements apparently determine six unknown angles $\psi_R$, $\theta_R$, $\phi_R$, $\phi_T$, $\theta_T$, $\psi_T$. However, the dipole-field matrix has an overall azimuthal (x-y) symmetry, i.e., it commutes with the azimuthal rotators $\phi_R$ and $\phi_T$ $$\begin{pmatrix} \cos\phi_R & \sin\phi_R & 0 \\ -\sin\phi_R & \cos\phi_R & 0 \\ 0 & 0 & 1 \end{pmatrix} \begin{pmatrix} -1 & 0 & 0 \\ 0 & -1 & 0 \\ 0 & 0 & 2 \end{pmatrix} \begin{pmatrix} \cos\phi_T & -\sin\phi_T & 0 \\ \sin\phi_T & \cos\phi_T & 0 \\ 0 & 0 & 1 \end{pmatrix} = \quad (27)$$

$$\begin{pmatrix} -\cos\phi_R\cos\phi_T - \sin\phi_R\sin\phi_T & \cos\phi_R\sin\phi_T - \sin\phi_R\cos\phi_T & 0 \\ \sin\phi_R\cos\phi_T - \cos\phi_R\sin\phi_T & -\sin\phi_R\sin\phi_T - \cos\phi_R\cos\phi_T & 0 \\ 0 & 0 & 2 \end{pmatrix} =$$

$$\begin{pmatrix} -\cos(\phi_R - \phi_T) & -\sin(\phi_R - \phi_T) & 0 \\ \sin(\phi_R - \phi_T) & -\cos(\phi_R - \phi_T) & 0 \\ 0 & 0 & 2 \end{pmatrix} = \begin{pmatrix} -\cos\phi_{RT} & -\sin\phi_{RT} & 0 \\ \sin\phi_{RT} & -\cos\phi_{RT} & 0 \\ 0 & 0 & 2 \end{pmatrix}$$

Only the difference between the two azimuthal angles $\phi_{RT} \equiv \phi_R - \phi_T$ affects the magnetic-field measurements which thus are invariant under simultaneous rotation of the transmitter and receiver triaxial sondes around the transmitter-receiver direction-axis.

Next, the zenith rotations $\theta_R$, $\theta_T$ are applied to the combined, azimuthally rotated dipole-field matrix. These zenith rotations correspond to the rotations of the simplified example in equations (9) through (16).

$$\begin{pmatrix} h_{xx} & h_{xy} & h_{xz} \\ h_{yx} & h_{yy} & h_{yz} \\ h_{zx} & h_{zy} & h_{zz} \end{pmatrix} = \begin{pmatrix} \cos\psi_R & -\sin\psi_R & 0 \\ \sin\psi_R & \cos\psi_R & 0 \\ 0 & 0 & 1 \end{pmatrix} * \quad (28)$$

$$\begin{pmatrix} \cos\theta_R & 0 & -\sin\theta_R \\ 0 & 1 & 0 \\ \sin\theta_R & 0 & \cos\theta_R \end{pmatrix} \begin{pmatrix} -\cos\phi_{RT} & -\sin\phi_{RT} & 0 \\ \sin\phi_{RT} & -\cos\phi_{RT} & 0 \\ 0 & 0 & 2 \end{pmatrix} \begin{pmatrix} \cos\theta_T & 0 & \sin\theta_T \\ 0 & 1 & 0 \\ -\sin\theta_T & 0 & \cos\theta_T \end{pmatrix} *$$

$$\begin{pmatrix} \cos\psi_T & \sin\psi_T & 0 \\ -\sin\psi_T & \cos\psi_T & 0 \\ 0 & 0 & 1 \end{pmatrix} \begin{pmatrix} 1 & 0 & 0 \\ 0 & 1 & 0 \\ 0 & 0 & 1 \end{pmatrix}$$

The matrix product yields $$\begin{pmatrix} \cos\theta_R & 0 & -\sin\theta_R \\ 0 & 1 & 0 \\ \sin\theta_R & 0 & \cos\theta_R \end{pmatrix} \begin{pmatrix} -\cos\phi_{RT} & -\sin\phi_{RT} & 0 \\ \sin\phi_{RT} & -\cos\phi_{RT} & 0 \\ 0 & 0 & 2 \end{pmatrix} \begin{pmatrix} \cos\theta_T & 0 & \sin\theta_T \\ 0 & 1 & 0 \\ -\sin\theta_T & 0 & \cos\theta_T \end{pmatrix} = \quad (29)$$

$$\begin{pmatrix} -\cos\phi_{RT}\cos\theta_R\cos\theta_T & -\sin\phi_{RT}\cos\theta_R & -\cos\phi_{RT}\cos\theta_R\sin\theta_T \\ +2\sin\theta_R\sin\theta_T & & -2\sin\theta_R\cos\theta_T \\ \sin\phi_{RT}\cos\theta_T & -\cos\phi_{RT} & \sin\phi_{RT}\sin\theta_T \\ -\cos\phi_{RT}\sin\theta_R\cos\theta_T & -\sin\phi_{RT}\sin\theta_R & -\cos\phi_{RT}\sin\theta_R\sin\theta_T \\ -2\cos\theta_R\sin\theta_T & & +2\cos\theta_R\cos\theta_T \end{pmatrix}$$

Without the remaining nadir rotations $\psi_R$, $\psi_T$, the matrix would readily determine the three unknown angles. The $h_{yy}$ measurement is unaffected by the zenith rotations in the x-z-plane and thus would provide the azimuthal angle $\phi_{RT}$. With this angle, the measurements of $h_{xy}$ and $h_{zy}$ would determine $\theta_R$, and the measurements of $h_{yx}$ and $h_{yz}$ would determine $\theta_T$. Both zenith angles would be determined with a two-fold redundancy. The special case $\phi_{RT}=0$ reduces the matrix in equation (29) to the simplified matrix in equation (14).

However, the matrix in equation (29) must still be nadir-rotated by $\psi_R$ and $\psi_T$. The resulting final matrix is written in component-form to illustrate how complex the combined expressions become:

$h_{xx} = -\cos\phi_{RT}\cos\theta_R\cos\theta_T\cos\psi_R + 2\sin\theta_R\sin\theta_T\cos\psi_R\cos\psi_T + \sin\phi_{RT}\cos\theta_R\cos\psi_R\sin\psi_T - \sin\phi_{RT}\cos\theta_T\sin\psi_R\cos\psi_T - \cos\phi_{RT}\sin\psi_R\sin\psi_T$ $h_{xy} = -\cos\phi_{RT}\cos\theta_R\cos\theta_T\cos\psi_R\sin\psi_T + 2\sin\theta_R\sin\theta_T\cos\psi_R\sin\psi_{T-\sin\phi_{RT}}\cos\theta_R\cos\psi_R\cos\psi_T - \sin\phi_{RT}\cos\theta_T\sin\psi_R\sin\psi_T + \cos\phi_{RT}\sin\psi_R\cos\psi_T$ $h_{xz} = -\cos\phi_{RT}\cos\theta_R\sin\theta_T\cos\psi_R - 2\sin\theta_R\cos\theta_T\cos\psi_R - \sin\phi_{RT}\sin\theta_T\sin\psi_R$ $h_{yx} = -\cos\phi_{RT}\cos\theta_R\cos\theta_T\sin\psi_R\cos\psi_T + 2\sin\theta_R\sin\theta_T\sin\psi_R\cos\psi_{T+\sin\phi_{RT}}\cos\theta_R\sin\psi_R\sin\psi_T + \sin\phi_{RT}\cos\theta_T\cos\psi_R\cos\psi_T + \cos\phi_{RT}\cos\psi_R\sin\psi_T$ $h_{yy} = -\cos\phi_{RT}\cos\theta_R\cos\theta_T\sin\psi_R\sin\psi_T + 2\sin\theta_R\sin\theta_T\sin\psi_R\sin\psi_{T-\sin\phi_{RT}}\cos\theta_R\sin\psi_R\cos\psi_T + \sin\phi_{RT}\cos\theta_T\cos\psi_R\sin\psi_T - \cos\phi_{RT}\cos\psi_R\cos\psi_T$ $h_{yz} = -\cos\phi_{RT}\cos\theta_R\sin\theta_T\sin\psi_R - 2\sin\theta_R\cos\theta_T\sin\psi_R + \sin\phi_{RT}\sin\theta_T\cos\psi_R$ $h_{zx} = -\cos\phi_{RT}\sin\theta_R\cos\theta_T\cos\psi_T - 2\cos\theta_R\sin\theta_T\cos\psi_T - \sin\phi_{RT}\sin\theta_R\sin\psi_T$ $h_{zy} = -\cos\phi_{RT}\sin\theta_R\cos\theta_T\sin\psi_T - 2\cos\theta_R\sin\theta_T\sin\psi_T - \sin\phi_{RT}\sin\theta_R\cos\psi_T$ $h_{zz} = -\cos\phi_{RT}\sin\theta_R\sin\theta_T - 2\cos\theta_R\cos\theta_T \quad (30)$ To actually solve for the angles $\psi_R$, $\theta_R$, $\phi_{RT}$, $\theta_T$, $\psi_T$, it is easier to return to the matrix equation (29) before it is nadir-rotated and denote it as $h'_{ij}$:

$$\begin{pmatrix} \cos\psi_R & -\sin\psi_R & 0 \\ \sin\psi_R & \cos\psi_R & 0 \\ 0 & 0 & 1 \end{pmatrix} \begin{pmatrix} h'_{xx} & h'_{xy} & h'_{xz} \\ h'_{yx} & h'_{yy} & h'_{yz} \\ h'_{zx} & h'_{zy} & h'_{zz} \end{pmatrix} \begin{pmatrix} \cos\psi_T & \sin\psi_T & 0 \\ -\sin\psi_T & \cos\psi_T & 0 \\ 0 & 0 & 1 \end{pmatrix} = \quad (31)$$

$$\begin{pmatrix}
\begin{matrix} h'_{xx}\cos\psi_R\cos\psi_T \\ -h'_{xy}\cos\psi_R\sin\psi_T \\ -h'_{yx}\sin\psi_R\cos\psi_T \\ +h'_{yy}\sin\psi_R\sin\psi_T \end{matrix} &
\begin{matrix} h'_{xx}\cos\psi_R\sin\psi_T \\ +h'_{xy}\cos\psi_R\cos\psi_T \\ -h'_{yx}\sin\psi_R\sin\psi_T \\ -h'_{yy}\sin\psi_R\cos\psi_T \end{matrix} &
\begin{matrix} h'_{xz}\cos\psi_R \\ -h'_{yz}\sin\psi_R \\ \\ \end{matrix} \\
\begin{matrix} h'_{xx}\sin\psi_R\cos\psi_T \\ -h'_{xy}\sin\psi_R\sin\psi_T \\ +h'_{yx}\cos\psi_R\cos\psi_T \\ -h'_{yy}\cos\psi_R\sin\psi_T \end{matrix} &
\begin{matrix} h'_{xx}\sin\psi_R\sin\psi_T \\ +h'_{xy}\sin\psi_R\cos\psi_T \\ +h'_{yx}\cos\psi_R\sin\psi_T \\ -h'_{yy}\cos\psi_R\cos\psi_T \end{matrix} &
\begin{matrix} h'_{xz}\sin\psi_R \\ +h'_{yz}\cos\psi_R \\ \\ \end{matrix} \\
h'_{zx}\cos\psi_T - h'_{zy}\sin\psi_T & h'_{zx}\sin\psi_T + h'_{yx}\cos\psi_T & h'_{zz}
\end{pmatrix} = \begin{pmatrix} h_{xx} & h_{xy} & h_{xz} \\ h_{yx} & h_{yy} & h_{yz} \\ h_{zx} & h_{zy} & h_{zz} \end{pmatrix}$$

The nadir rotations in the x-y—plane divide the 3×3 matrix h' into four distinct parts: The 2×2 (x-y)—matrix which depends on both $\psi_R$ and $\psi_T$:

$$\begin{pmatrix} h'_{xx} & h'_{xy} \\ h'_{yx} & h'_{yy} \end{pmatrix} \quad (32a)$$

the two dimensional row vector which depends on $\psi_T$ $$(h'_{zx} \; h'_{zy}) \quad (32b)$$

the two dimensional column vector which depends on $\psi_R$ $$\begin{pmatrix} h'_{xz} \\ h'_{yz} \end{pmatrix} \quad (32c)$$

and the single matrix entry which does not change under nadir rotations $$h'_{zz} \quad (32d)$$

These four sub-matrices generate four invariants, namely four quantities which do not change under the nadir rotations $\psi_R$ and $\psi_T$.

a) The 2×2 matrix (32a) provides the determinant.
b) The two-dimensional row vector (32b) provides the vector length.
c) The two-dimensional column vector (32c) provides the vector length.
d) The single matrix entry (32d) constitutes the fourth invariant.

Since the four quantities are unaffected by the nadir rotation they are the same for the matrices h and h'. The matrix h has been measured and normalized by $4\pi r^3/m$. These results, together with the four invariants are applied to the matrix h'.

The matrix h' in the representation of equation (29) provides explicit expressions for these four invariants which are solved for the two zenith angles $\theta_R$, $\theta_T$ and the azimuthal angle $\phi_{RT}$.

$$\begin{vmatrix} h_{xx} & h_{xy} \\ h_{yx} & h_{yy} \end{vmatrix} = \begin{vmatrix} h'_{xx} & h'_{xy} \\ h'_{yx} & h'_{yy} \end{vmatrix} = h'_{xx}h'_{yy} - h'_{xy}h'_{yx} \quad (33a)$$

$$= \cos^2\phi_{RT}\cos\theta_R\cos\theta_T - 2\cos\phi_{RT}\sin\theta_R\sin\theta_T + \sin^2\phi_{RT}\cos\theta_R\cos\theta_T$$

$$= \cos\theta_R\cos\theta_T - 2\cos\phi_{RT}\sin\theta_R\sin\theta_T$$

$$h^2_{zx}+h^2_{zy} = h'^2_{zx}+h'^2_{zy} \quad (33b)$$

$$= \cos^2\phi_{RT}\sin^2\theta_R\cos^2\theta_T + 4\cos^2\theta_R\sin^2\phi_T - 4\cos\phi_{RT}\sin\theta_R\sin\theta_T\cos\theta_R\cos\theta_T + \sin^2\phi_{RT}\sin^2\theta_R$$

$$h^2_{xz}+h^2_{yz} = h'^2_{xz}+h'^2_{yz} \quad (33c)$$

$$= \cos^2\phi_{RT}\cos^2\theta_R\sin^2\theta_T + 4\sin^2\theta_R\cos^2\phi_T - 4\cos\phi_{RT}\sin\theta_R\sin\theta_R\cos\theta_R\cos\theta_T + \sin^2\phi_{RT}\sin^2\theta_T$$

$$h_{zz} = h'_{zz} = 2\cos\theta_R\cos\theta_T - \cos\phi_{RT}\sin\theta_R\sin\theta_T \quad (33d)$$

The first and last invariant (32a) and (32d), are solved for two intermediate quantities:

$$\cos\phi_{RT}\sin\theta_R\sin\theta_T = 1/3(h_{zz}-2(h_{xx}h_{yy}-h_{xy}h_{yx}))=A \quad (34a)$$

$$\cos\theta_R\cos\theta_T = 1/3(2h_{zz}-(h_{xx}h_{yy}-h_{xy}h_{yx}))=B \quad (34b)$$

The product of these quantities appears in the two remaining invariants (32b) and (32c)

$$4\cos\phi_{RT}\sin\theta_R\sin\theta_T\cos\theta_R\cos\theta_T = 4/9(h_{zz}-2(h_{xx}h_{yy}-h_{xy}h_{yx}))(2h_{zz}-(h_{xx}h_{yy}-h_{xy}h_{yx}))=4AB \quad (35)$$

and is used to simplify the invariant expressions (33b) and 33c):

$$h^2_{zx}+h^2_{zy}+4AB=\cos^2\phi_{RT}\sin^2\theta_R\cos^2\theta_T+4\cos^2\theta_R\sin^2\phi_T+\sin^2\phi_{RT}\sin^2\theta_R \quad (33b')$$

$$h^2_{xz}+h^2_{yz}+4AB=\cos^2\phi_{RT}\cos^2\theta_R\sin^2\theta_T+4\sin^2\theta_R\cos^2\phi_T+\sin^2\phi_{RT}\sin^2\theta_T \quad (33c')$$

These invariants are further simplified by substituting $(1-\sin^2\theta_{R,T})$ for $\cos^2\theta_{R,T}$ in the first terms and $(1-\cos^2\theta_{R,T})$ for $\sin^2\theta_{R,T}$ in the second terms. These substitutions consolidate the $\sin^2\theta_{R,T}$ and $\cos^2\theta_{R,T}$ terms.

$$h_{zx}^2 + h_{zy}^2 + 4AB = \sin^2\theta_R - \cos^2\phi_{RT}\sin^2\theta_R\sin^2\theta_T + 4\cos^2\theta_R - 4\cos^2\theta_R\cos^2\theta_T \quad (33b'')$$
$$= \sin^2\theta_R - A^2 + 4\cos^2\theta_R - 4B^2$$

$$h_{zx}^2 + h_{yz}^2 + 4AB = \sin^2\theta_T - \cos^2\phi_{RT}\sin^2\theta_R\sin^2\theta_T + 4\cos^2\theta_T - 4\cos^2\theta_R\cos^2\theta_T \quad (33c'')$$
$$= \sin^2\theta_T - A^2 + 4\cos^2\theta_T - 4B^2$$

$$h^2_{zx}+h^2_{zy}A^2+4AB+4B^2=h^2_{zx}+h^2_{zx}+h^2_{zy}+(A+2B)^2=4-3\sin^2\theta_R \quad (33b''')$$

$$h^2_{xz}+h^2_{yz}+A^2+4AB+4B=h^2_{xz}+h^2_{yz}+(A+2B)^2=4-3\sin^2\theta_T \quad (33c''')$$

$$\sin^2\theta_R = 1/3(4-h^2_{zx}-h^2_{zy}-(A+2B)^2) \quad (36a)$$

$$\sin^2\theta_T = 1/3(4-h^2_{xz}-h^2_{yz}-(A+2B)^2) \quad (36b)$$

The zenith angles $\theta_R$ and $\theta_T$ fall between 0° and 180°, so their sine is always positive.

The zenith angles $\theta_R$ and $\theta_T$ are used in the intermediate quantity A to determine the azimuthal difference angle $\phi_{RT}$:

$$\cos\phi_{RT} = \frac{h_{zz} - 2(h_{xx}h_{yy} - h_{xy}h_{yx})}{3\sin\theta_R\sin\theta_T} \quad (37)$$

This expression has a 180° ambiguity which reflects the invariance of the measurement under simultaneous polarization flip of the source dipole and receiver magnetometer.

The zenith angles $\theta_R$, $\theta_T$ and the azimuthal difference angle $\phi_{RT}$ determine the matrix h' from equation (29). With this known matrix, equation (31) provides identities for the nadir angles $\psi_R$ and $\psi_T$. For example, the two-dimensional vectors from equations (32b) and (32c) can be used to determine the nadir angles. The 2×2 matrix from equation (32a) becomes redundant and thus serves as quality control check.

I claim:

1. Apparatus for determining alignment of first and second tool parts in a borehole tool system, comprising:
   a) transmitter means in the first tool part which transmits orthogonal electromagnetic signals and comprise a circuit including capacitor means and coil means, the capacitor means acting as an energy store, the coil means as a transmitter antenna, and the capacitor means and coil means together acting as an oscillating circuit;
   b) receiver means in the second tool part which receives and measures components of each signal in orthogonal directions; and
   c) means for determining on the basis of the components of each signal in the orthogonal directions, the alignment of the first and second tool parts.

2. Apparatus as claimed in claim 1, wherein the transmitter means transmits three mutually orthogonal signals and the receiver means receives and measures components in three mutually orthogonal directions.

3. Apparatus as claimed in claim 1, wherein the signals have a frequency which places the receiver means in the near field of the transmitter means.

4. Apparatus as claimed in claim 1, wherein the signals have a frequency of not more than about 10 Hz.

5. Apparatus as claimed in claim 1, wherein the signals have a frequency such that the signal is substantially unaffected by formations surrounding the borehole and any medium filling the borehole.

6. Apparatus as claimed in claim 2, wherein the transmitter means comprises three mutually orthogonal transmitters.

7. Apparatus as claimed in claim 6, wherein the transmitters operate sequentially to transmit the three signals.

8. Apparatus as claimed in claim 6, wherein the transmitters operate simultaneously to transmit the three signals.

9. Apparatus as claimed in claim 1, wherein the receiver means measures the components of a magnetic field generated by the signals at the receiver means.

10. Apparatus as claimed in claim 9, wherein the receiver means comprises a triaxial magnetometer.

11. Apparatus as claimed in claim 1, wherein the transmitter means comprises three orthogonal transmitters, each with its own capacitor and coil.

12. Apparatus as claimed in claim 1, wherein the coil means comprises three mutually orthogonal coils, each of which can be connected to the capacitor means.

13. Apparatus as claimed in claim 12, wherein the coils have different impedances so as to produce signals of difference frequencies.

14. Apparatus as claimed in claim 1, wherein the first tool part is positioned in a first well and the second tool part is positioned in a second well, spaced from the first.

15. Apparatus as claimed in claim 1, wherein the first and second tool parts are adjacent and connected by a non-rigid connector in the same borehole.

16. Apparatus as claimed in claim 1, wherein the first and second tool parts also comprise signal transmitters and receivers for formation evaluation signals.

17. Apparatus as claimed in claim 16, wherein the formation evaluation signals are electromagnetic signals.

18. Apparatus as claimed in claim 16, wherein the formation evaluation signals are acoustic signals.

19. A method of characterizing a formation surrounding a borehole, comprising:
   a) providing a borehole tool system having first and second parts, at least one of which is positioned in the borehole;
   b) transmitting orthogonal electromagnetic signals from transmitter means in the first tool part comprising a circuit including capacitor means and coil means, the capacitor means acting as an energy store, the coil means as a transmitter antenna, and the capacitor means and coil means together acting as an oscillating circuit;
   c) receiving each signal and measuring components of each signal in orthogonal directions at receiver means in the second tool part;
   d) using the measured components of each signal in the orthogonal directions at the receiver to determine the alignment of the first and second parts;
   e) transmitting formation evaluation signals between the first and second tool parts through the formation; and
   f) using the formation evaluation signals which have been transmitted through the formation to evaluate the formation.

20. A method as claimed in claim 19, wherein the orthogonal signals comprise three mutually orthogonal signals and the components are detected and measured in three mutually orthogonal directions.

21. A method as claimed in claim 19, wherein the formation evaluation signals are electromagnetic signals.

22. A method as claimed in claim 19, wherein the formation evaluation signals are acoustic signals.

23. A method as claimed in claim 19, wherein the first and second tool parts are in the same borehole and connected by a non-rigid connector.

24. A method as claimed in claim 19, wherein the first tool part is located in the first well and the second tool part is located in a second well spaced from the first.

* * * * *